(12) United States Patent
Katayama et al.

(10) Patent No.: US 12,280,847 B2
(45) Date of Patent: Apr. 22, 2025

(54) DRIVER ASSISTANCE SYSTEM FOR MOTORCYCLE

(71) Applicant: HONDA MOTOR CO., LTD., Tokyo (JP)

(72) Inventors: Makoto Katayama, Saitama (JP); Hiroki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 230 days.

(21) Appl. No.: 18/186,966

(22) Filed: Mar. 21, 2023

(65) Prior Publication Data

US 2023/0312044 A1    Oct. 5, 2023

(30) Foreign Application Priority Data

Mar. 29, 2022  (JP) ................. 2022-053392

(51) Int. Cl.
*B62J 50/21*  (2020.01)
*B60L 15/20*  (2006.01)
(Continued)

(52) U.S. Cl.
CPC ............... *B62J 50/21* (2020.02); *B60L 15/20* (2013.01); *B60L 15/2009* (2013.01); *B60W 30/18036* (2013.01); *B60W 50/14* (2013.01); *B62J 27/00* (2013.01); *B62J 45/20* (2020.02); *B62J 45/41* (2020.02); *B62J 50/22* (2020.02);
(Continued)

(58) Field of Classification Search
CPC ... B62J 50/21; B62J 27/00; B62J 45/20; B62J 45/41; B62J 50/22; B60L 15/20; B60L 15/2009; B60L 2200/24; B60L 2240/42; B60W 30/18036; B60W 50/14; B60W 2050/143; B60W 2300/36; B60W 2554/40; B60W 2554/4041; B62K 23/02; B62L 3/026

See application file for complete search history.

(56) References Cited

U.S. PATENT DOCUMENTS 8,655,564 B2 * 2/2014 Breuer ................ B60T 7/22
701/70
2006/0250297 A1 * 11/2006 Prakah-Asante ..... G01S 13/862
367/87
(Continued)

FOREIGN PATENT DOCUMENTS

JP      S62221927 A    9/1987

*Primary Examiner* — Phutthiwat Wongwian
*Assistant Examiner* — Susan E Scharpf
(74) *Attorney, Agent, or Firm* — CKC & Partners Co., LLC

(57) ABSTRACT

A driver assistance system 1 for a motorcycle is provided with: a driving force output device 82 that generates a backup output for reversing a drive wheel and backing up a vehicle body; a brake lever 810 squeezably operable by a rider; a ACC main switch 43 and an ACC lever 44 operable by the rider; and a back out assistance controller 64 that controls the driving force output device 82 on the basis of the operation of the lever 810, the switch 43, and the lever 44. The back out assistance controller 64, after causing the driving force output device 82 to generate the backup output when triggered by receiving an operation of turning the lever 44 to a "SET/−" side, continues to cause the backup output to be generated until the lever 810 is operated, or until the switch 43 or lever 44 is turned off.

5 Claims, 9 Drawing Sheets

(51) Int. Cl.
  *B60W 30/18* (2012.01)
  *B60W 50/14* (2020.01)
  *B62J 27/00* (2020.01)
  *B62J 45/20* (2020.01)
  *B62J 45/41* (2020.01)
  *B62J 50/22* (2020.01)
  *B62K 23/02* (2006.01)
  *B62L 3/02* (2006.01)

(52) U.S. Cl.
  CPC .............. *B62K 23/02* (2013.01); *B62L 3/026* (2013.01); *B60L 2200/24* (2013.01); *B60L 2240/42* (2013.01); *B60W 2050/143* (2013.01); *B60W 2300/36* (2013.01); *B60W 2554/40* (2020.02); *B60W 2554/4041* (2020.02)

(56) References Cited

U.S. PATENT DOCUMENTS

| | | | | |
|---|---|---|---|---|
| 2007/0272464 | A1* | 11/2007 | Takae | B60W 50/14 180/169 |
| 2011/0295452 | A1* | 12/2011 | Meyers | B60K 7/0007 180/220 |
| 2011/0295454 | A1* | 12/2011 | Meyers | B62K 11/10 180/219 |
| 2013/0238233 | A1* | 9/2013 | Kim | B60W 30/09 701/301 |
| 2016/0039421 | A1* | 2/2016 | Kaneta | B60T 8/1706 477/73 |
| 2018/0267537 | A1* | 9/2018 | Kroop | B60W 30/10 |
| 2019/0039603 | A1* | 2/2019 | Hashimoto | B60W 10/184 |
| 2022/0126690 | A1* | 4/2022 | Maeda | G08G 1/16 |
| 2022/0135165 | A1* | 5/2022 | Tamashima | B60W 10/18 701/96 |
| 2022/0161788 | A1* | 5/2022 | Tamashima | B60W 30/12 |
| 2022/0250615 | A1* | 8/2022 | Tanaka | B60W 10/06 |
| 2022/0315161 | A1* | 10/2022 | Katayama | B60T 8/1706 |
| 2023/0150509 | A1* | 5/2023 | Kato | B60W 10/04 701/26 |
| 2023/0322214 | A1* | 10/2023 | Katayama | B60W 30/09 701/301 |

* cited by examiner

DRIVER ASSISTANCE SYSTEM FOR MOTORCYCLE

This application is based on and claims the benefit of priority from Japanese Patent Application No. 2022-053392, filed on 29 Mar. 2022, the content of which is incorporated herein by reference.

BACKGROUND OF THE INVENTION

Field of the Invention

The present invention relates to a driver assistance system for a motorcycle. More specifically, the present invention relates to a driver assistance system for a motorcycle provided with a backup function for backing up the vehicle body by reversing a wheel.

Related Art

When parking in a parking space, unlike four-wheeled automobiles, motorcycles are in many cases parked by what is called head-in parking, with the front of the vehicle facing into the parking space. In the case of such head-in parking, the rider needs to back up under their own power while supporting the vehicle body when leaving the parking space.

The larger the vehicle body, the more significant is such effort when taking a motorcycle out of a parking space. For this reason, some large motorcycles are equipped with a backup function that backs up the vehicle body by reversing the drive wheel using driving force generated by a power source mounted on the vehicle body. For example, Japanese Unexamined Patent Application, Publication No. S62-221927 discloses an invention for backing up a vehicle body by using a cell motor for starting the engine. The vehicle body of a motorcycle equipped with such a backup function can be backed up simply by operating switches located at the base of the handlebar grip, which is particularly convenient when leaving a parking space.

Patent Document 1: Japanese Unexamined Patent Application, Publication No. S62-221927

SUMMARY OF THE INVENTION

However, according to the invention disclosed in Japanese Unexamined Patent Application, Publication No. S62-221927, it is necessary to keep energizing the cell motor to keep backing up the vehicle body, and therefore the rider needs to keep pressing a switch located at the base of a handlebar grip. When taking a motorcycle out of a parking space, the rider needs to keep holding the handlebar grips so that the vehicle body does not tip over, while also paying attention to the rear. Moreover, if other motorcycles are parked to the left and right of the rider's own vehicle, the rider also needs to pay attention to the left and right sides in addition to the rear of the rider's own vehicle. In this way, when leaving a parking space, the rider needs to hold the handlebar grips so that the vehicle body does not tip over while also paying attention to the rear as well as the left and right of the vehicle, and therefore the operation of keeping a switch pressed is a heavy burden on the rider.

An objective of the present invention is to provide a driver assistance system for a motorcycle that can lessen the burden on the rider when backing out of a parking space.

(1) An aspect of the present invention is directed to a driver assistance system (for example, a driver assistance system 1 described later) for a motorcycle. The driver assistance system is provided with: a wheel driver (for example, a driving force output device 82 described later) that generates a forward output for turning a wheel forward and moving a vehicle body forward, or generates a backup output for reversing the wheel and backing up the vehicle body; a brake lever (for example, a brake lever 810 described later) squeezably operable by a rider; a control switch (for example, an ACC main switch 43 and an ACC lever 44 described later) operable by the rider; and a backup assistance controller (for example, a back out assistance controller 64 described later) that controls the wheel driver on the basis of an operation of the brake lever and the control switch. The backup assistance controller, after causing the wheel driver to generate the backup output when triggered by the control switch being turned on, continues to cause the backup output to be generated until the brake lever is operated or the control switch is turned off.

(2) In this case, the driver assistance system preferably is further provided with a rear sensor (for example, a rearward radar unit 23 described later) that detects an object behind the vehicle body, wherein the backup assistance controller stops the backup output if an object approaching the vehicle body is detected by the rear sensor while backing up the vehicle body.

(3) In this case, the driver assistance system preferably is further provided with a warning emitter (for example, a warning emitter 40 described later) that produces a warning directed at the rider, wherein the backup assistance controller activates a warning by the warning emitter and stops the backup output if an object approaching the vehicle body is detected by the rear sensor while backing up the vehicle body.

(4) In this case, the driver assistance system preferably is further provided with a backup distance measurer (for example, a backup distance sensor described later) that measures a backup distance of the vehicle body, wherein the backup assistance controller, after initiating backup of the vehicle body, stops the backup output in response to the backup distance reaching a predetermined distance.

(5) In this case, the backup assistance controller preferably, after causing the backup output to be generated, stops the backup output in a case where the vehicle body is maintained at a standstill by the operation of the brake lever for a predetermined time or longer.

(1) A driver assistance system for a motorcycle according to the present invention is provided with: a wheel driver that generates a backup output for reversing the wheel and backing up the vehicle body; a brake lever squeezably operable by the rider; a control switch operable by the rider; and a backup assistance controller that controls the wheel driver on the basis of an operation of the brake lever and the control switch. The backup assistance controller, when triggered by the control switch being turned on, causes the wheel driver to generate backup output and starts backup of the vehicle body. Also, after the backup output is generated, the backup assistance controller continues to cause the backup output to be generated until the brake lever is operated or the control switch is turned off. For this reason, when backing the vehicle out of a parking space, the rider can cause the vehicle body to keep backing up simply by turning on the control switch initially, without having to keep the control switch turned on. Thus, according to the present invention, the rider can grip the handlebar grips so that the vehicle body does not tip over and concentrate on maintaining balance so that the vehicle body does not fall while also paying attention to the rear as well as the left and right of the vehicle, thereby lessening the burden on the rider when backing out. Furthermore, according to the present invention, by lessening the burden on the rider when backing out, contact with another vehicle and the tip over of the rider's own vehicle when backing out can also be suppressed, thereby improving traffic safety.

(2) In the present invention, the backup assistance controller stops the backup output if an object approaching the vehicle body is detected by a rear sensor while backing up the vehicle body. Thus, according to the present invention, since the vehicle stops automatically if another vehicle approaches the rider's own vehicle while backing up the vehicle body, contact with the other vehicle can be suppressed, and by extension, traffic safety can also be improved.

(3) In the present invention, the backup assistance controller activates a warning by the warning emitter and stops the backup output if an object approaching the vehicle body is detected by a rear sensor while backing up the vehicle body. Thus, according to the present invention, the rider can rapidly grasp that the backup of the vehicle body has stopped automatically because of the approach of another vehicle, and immediately resume backup of the vehicle body after confirming that the other vehicle has passed.

(4) The size of a parking space and the width of an aisle adjacent to a parking space are often the same from country to country. For this reason, when backing out a vehicle from a parking space, the necessary backup distance is generally the same in many cases. Accordingly, in the present invention, after initiating backup of the vehicle body, the backup assistance controller stops the backup output in response to the backup distance reaching a predetermined distance. Thus, according to the present invention, when the backup distance reaches the predetermined distance after the backup of the vehicle body is initiated by the rider turning on the control switch, the vehicle stops automatically without requiring the rider to operate a brake lever, control switch, or the like, and therefore the burden on the rider when backing out can be lessened further, and by extension, traffic safety can be improved further.

(5) In the present invention, after causing the backup output to be generated, the backup assistance controller stops the backup output in a case where the vehicle body is maintained at a standstill by the operation of the brake lever for a predetermined time or longer. Thus, according to the present invention, the backup output does not stop immediately even if the backup speed goes to 0 temporarily while the rider is backing up the vehicle body while adjusting the backup speed by operating the brake lever, and therefore convenience can be improved.

DETAILED DESCRIPTION OF THE INVENTION

Hereinafter, a configuration of a driver assistance system according to an embodiment of the present invention will be described with reference to the drawings.

Figure 1:
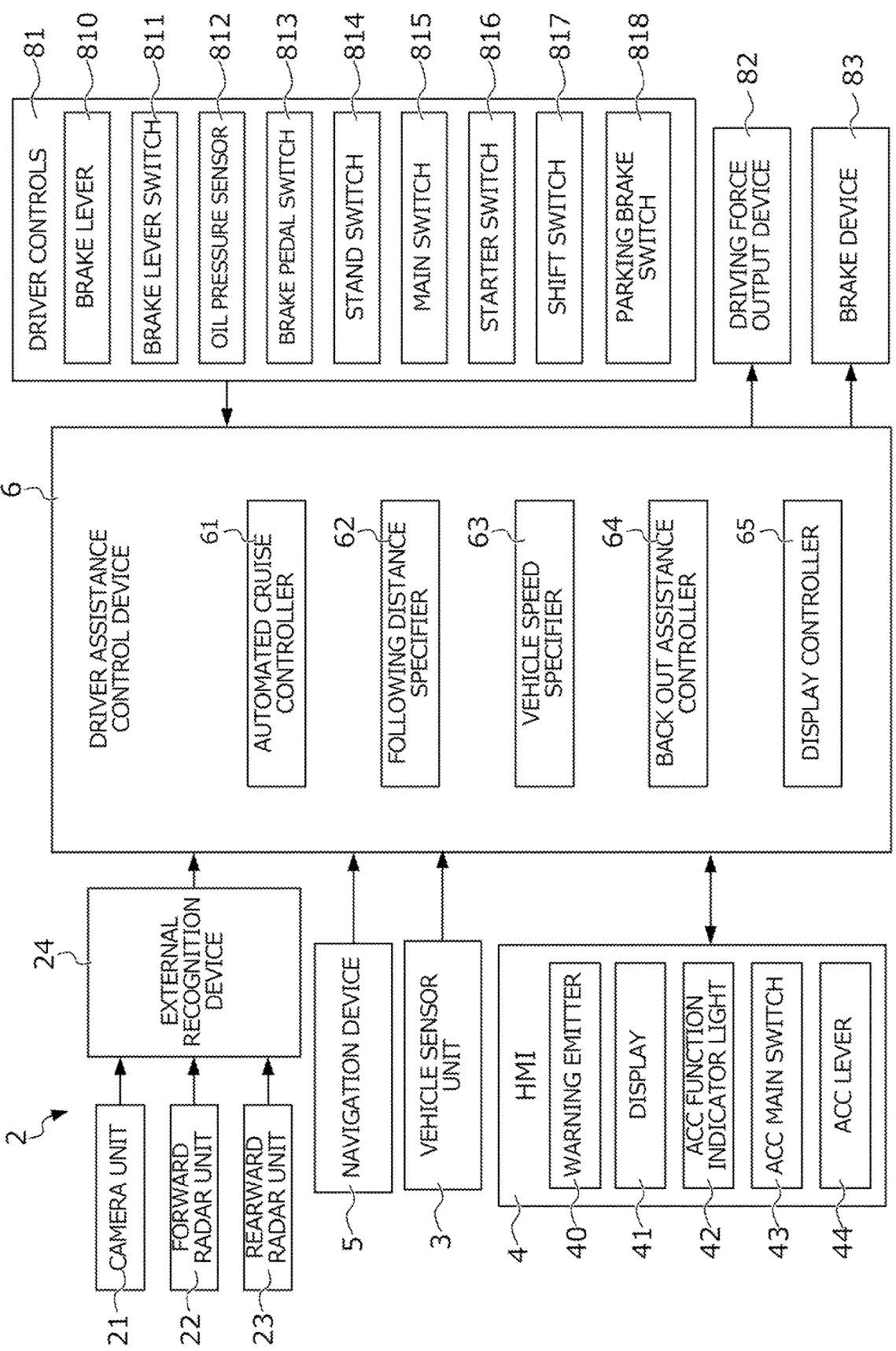
FIG. 1 is a diagram that schematically illustrates a configuration of a driver assistance system according to an embodiment of the present invention.

FIG. 1 is a diagram illustrating a configuration of a driver assistance system 1 according to the present embodiment. The driver assistance system 1 is installed in a motorcycle not illustrated. Note that the drive source that turns the drive wheel (rear wheel) of the motorcycle may be an internal combustion engine, a rotary electric motor, or a combination of the two. Also, the power source of the rotary electric motor may be a secondary battery, a capacitor, or a fuel cell. Note that although the case of implementing an internal combustion engine as the drive source is described below, the present invention is not limited thereto.

The driver assistance system 1 assists with safe driving of a motorcycle by the driver. Among the various driver assistance functions achieved by the driver assistance system 1, the following describes an ACC function that automatically controls at least one selected from the following distance to the vehicle ahead and the speed of the driver's own vehicle (hereinafter also referred to as the "vehicle speed") to follow the vehicle ahead and a back out assistance function that assists with driving when the rider backs the vehicle body out of a parking space.

The driver assistance system 1 is provided with an external sensor unit 2, a vehicle sensor unit 3, a human-machine interface (HMI) 4 (hereinafter, the abbreviation "HMI 4" will be used), a navigation device 5, a driver assistance control device 6, driver controls 81, a driving force output device 82, and a brake device 83. These devices are interconnected by multiple communication lines such as controller area network (CAN) communication lines, serial communication lines, or a wireless communication network.

The external sensor unit 2 includes a camera unit 21, a forward radar unit 22, a rearward radar unit 23, an external recognition device 24, and the like.

The camera unit 21 is provided with a digital camera using a solid-state image sensor such as a charge-coupled device (CCD) sensor or a complementary metal-oxide semiconductor (CMOS) sensor, for example. The camera unit 21 is mounted to any location on the front part of the vehicle body (such as the front windshield or a mirror, for example) and faces the direction ahead of the vehicle. The forward radar unit 22 and the rearward radar unit 23 are provided with a millimeter-wave radar that detects an object by emitting a millimeter wave and measuring the reflected wave thereof returning from an object. The forward radar unit 22 is provided at any location on the front part of the vehicle body (such as the front windshield or a mirror, for example), faces the direction ahead of the vehicle, and detects objects ahead of the vehicle body. The rearward radar unit 23 is provided at any location on the rear part of the vehicle body (for example, near the tail lamp and near the direction indicators on the left and right sides) and faces the direction behind the vehicle.

The external recognition device 24 is a computer that applies sensor fusion processing to detection results from some or all of the camera unit 21, the forward radar unit 22, and the rearward radar unit 23, and thereby obtains information pertaining to the state ahead of the vehicle, and more specifically, information about the road and the positions, shapes, types, and speeds of objects as well as the content of road signs and the like existing ahead of the vehicle (hereinafter collectively referred to as "forward information") and information pertaining to objects existing behind the vehicle (hereinafter also referred to as "rearward information"). The external recognition device 24 transmits the acquired forward information and rearward information to the driver assistance control device 6, for example.

The vehicle sensor unit 3 is provided with an encoder that generates a pulse signal on an interval according to the rotational speed of a wheel, a vehicle speed sensor that detects the vehicle speed by counting the number of pulses outputted from the encoder during forward rotation of the wheel, a backup distance sensor that measures the backup distance by counting the number of pulse outputted from the encoder during reverse rotation of the wheel, a 5-axis or 6-axis inertial measurement device, and the like. The inertial measurement device detects the angle or angular velocity and the acceleration of the vehicle body of the vehicle on three axes (roll axis, pitch axis, and yaw axis). A detection signal from the vehicle sensor unit 3 is transmitted to the driver assistance control device 6, for example.

The HMI 4 includes a plurality of interfaces that present various information to an occupant of the vehicle and receive input operations performed by the occupant. FIG. 1 illustrates in particular only the components among the plurality of interfaces included in the HMI 4 that are related to an ACC function and a back out assistance function, namely a warning emitter 40, a display 41, an ACC function indicator light 42, an ACC main switch 43, and an ACC lever 44.

The warning emitter 40 produces a warning directed at the rider and in a form perceivable by the rider, on the basis of a command from the driver assistance control device 6. More specifically, a speaker that emits a warning sound is used as the warning emitter 40, for example.

The display 41 is provided at a position visible to the rider at driving, and displays an image corresponding to a command from a display controller 65 described later of the driver assistance control device 6. Information related to the ACC function described later, information related to the back out assistance function described later, and the like is displayed on the display 41.

The ACC main switch 43 and the ACC lever 44 function differently depending on whether the gear position of the driving force output device 82 is "D (drive)" (that is, a state allowing for forward movement) or whether the gear position is "N (neutral)" or "R (reverse)" (that is, a state no allowing for forward movement).

In at least the case in which the gear position is "D", the ACC main switch 43 is depressed by the rider when switching on/off the ACC function provided by the driver assistance control device 6. The ACC main switch 43 is located at the base of the accelerator grip, for example.

Also, in at least the case in which the gear position is "N" or "R", or more specifically, in the case in which an assistance acceptance condition (see step ST1 in FIG. 2) described later is met, the ACC main switch 43 is depressed by the rider when switching on/off the back out assistance function provided by the driver assistance control device 6.

In at least the case in which the gear position is "D", the ACC lever 44 is turned by the rider to change the set vehicle speed in the ACC function or to make the ACC function go from a standby state to a turned-on state. The ACC lever 44 can be turned from a neutral position to either a "RES/+" side or a "SET/−" side. The ACC lever 44 is located at the base of the accelerator grip, for example.

More specifically, if the rider turns the ACC lever 44 to the "SET/−" side when the ACC function provided by the driver assistance control device 6 is in the standby state, the ACC function goes to the turned-on state and the vehicle speed at that time is set as a set vehicle speed. Also, if the rider turns the ACC lever 44 to the "RES/+" side when the ACC function provided by the driver assistance control device 6 is in the standby state, a value stored in a memory not illustrated (the set vehicle speed from the previous turned-on state) is set as the set vehicle speed and the ACC function goes to the turned-on state.

Also, if the rider turns the ACC lever 44 to the "RES/+" side when the ACC function provided by the driver assistance control device 6 is in the turned-on state and the vehicle speed is equal to or greater than a predetermined speed, the set vehicle speed is increased in increments of a predetermined unit speed (for example, 1 [km/h]). Also, if the rider turns the ACC lever 44 to the "SET/−" side when the ACC function provided by the driver assistance control device 6 is in the turned-on state and the vehicle speed is equal to or greater than a predetermined speed, the set vehicle speed is decreased in decrements of the unit speed.

Also, in at least the case in which the gear position is "N" or "R", or more specifically, in the case in which the assistance acceptance condition (see step ST1 in FIG. 2) described later is met, the ACC lever 44 is turned by the rider when starting backup of the vehicle body by the back out assistance function or pausing backup of the vehicle body.

More specifically, if the rider turns the ACC lever 44 to the "SET/−" side when the back out assistance function provided by the driver assistance control device 6 is on, the generation of backup output is triggered and the vehicle body begins to back up. Also, if the rider turns the ACC lever 44 to the "RES/+" side while backup output is being generated, the backup output is paused and the vehicle body stops.

As above, in the present embodiment, since the ACC function used when moving the vehicle body forward and the back out assistance function used when backing up the vehicle body are not used simultaneously, the ACC main switch 43 and the ACC lever 44 are shared by the ACC function and the back out assistance function.

The ACC function indicator light 42 can emit light in a plurality of ways, such as red, green, and white, for example. The ACC function indicator light 42 is located at a position visible to the rider at driving. In the case in which the ACC function is in the turned-on state and an automated following distance control described later is in effect, the ACC function indicator light emits red light. In the case in which the ACC function is in the turned-on state and an automated speed control described later is in effect, the ACC function indicator light emits green light. Also, in the case in which the ACC function is in the standby state, the ACC function indicator light emits white light. Also, in the case in which the ACC function is in the turned-off state, the ACC function indicator light emits no light. Consequently, if the ACC main switch 43 is turned on by the rider, the ACC function indicator light emits light selected from red, green, and white. Also, if the ACC main switch 43 is turned off by the rider, the ACC function indicator light emits no light.

The navigation device 5 is provided with a global navigation satellite system (GNSS) receiver that specifies the current location of the vehicle on the basis of signals received from GNSS satellites, and a storage device storing map information, for example. The map information in this case also includes information related to road signs. The navigation device 5 transmits information pertaining to the current location of the vehicle, together with map information for the current location, to the driver assistance control device 6.

The driver controls 81 include a plurality of control elements operated when the rider drives the vehicle, and sensors or the like that detect the control inputs of the control elements. Note FIG. 1 illustrates in particular only the components among the plurality of control elements and sensors that are related to the ACC function and the back out assistance function, namely a brake lever 810, a brake lever switch 811, an oil pressure sensor 812, a brake pedal switch 813, a stand switch 814, a main switch 815, a starter switch 816, a shift switch 817, and a parking brake switch 818.

The brake lever 810 can be squeezed by the rider's right hand to apply braking to the front wheel with the brake device 83. The brake lever switch 811 is a sensor that detects the turning on/off of the brake lever 810 by the rider, or in other words, whether or not the brake lever 810 is being squeezed. The brake lever switch 811 transmits a signal corresponding to the turning on/off of the brake lever 810 to the driver assistance control device 6. The oil pressure sensor 812 is a sensor that detects the oil pressure of the oil hydraulic circuit in the brake device 83. A signal corresponding to a detection value from the oil pressure sensor 812 is transmitted to the driver assistance control device 6. Accordingly, the control input of the brake lever 810 by the rider is calculated by a process, not illustrated, in the driver assistance control device 6 on the basis of the detection value from the oil pressure sensor 812.

The brake pedal switch 813 is a sensor that detects the turning on/off of a brake pedal (not illustrated) that can be stepped on by the rider's right foot to apply braking to the rear wheel with the brake device 83. The brake pedal switch 813 transmits a signal corresponding to the turning on/off of the brake pedal to the driver assistance control device 6.

The stand switch 814 is a sensor that detects the state of a stand (a side stand and/or a main stand), not illustrated, that is used to make the bike freestanding. The stand switch 814 transmits a signal corresponding to the state of the stand to the driver assistance control device 6.

The main switch 815 is a sensor that the rider can operate to start/stop the driver assistance system 1. The main switch 815 transmits a signal corresponding to a start/stop operation by the rider to the driver assistance control device 6.

The starter switch 816 is a sensor that the rider can operate to start/stop the engine of the driving force output device 82. The starter switch 816 transmits a signal corresponding to a start/stop operation by the rider to the driver assistance control device 6.

The shift switch 817 is a switch that the rider can operate to shift the gear position of the driving force output device 82 between "N (neutral)" and "D (drive)". The shift switch 817 transmits a signal corresponding to a shift position shifting operation by the rider to the driver assistance control device 6.

The parking brake switch 818 is a sensor that detects the state of a parking brake lever that the rider can operate to engage or release a parking brake provided by a parking brake device not illustrated. The parking brake switch 818 transmits a signal corresponding to the state of the parking brake to the driver assistance control device 6.

The driving force output device 82 is provided with an engine as a source of driving force, a driving force transmission mechanism that changes the speed of the output of the engine for transmission to the drive wheel, an electronic control unit that controls the engine and the driving force transmission mechanism on the basis of a signal transmitted from the driver assistance control device 6, and the like. Note that the present embodiment describes a case of using a dual-clutch transmission as the driving force transmission mechanism, but the present invention is not limited thereto. In the driving force transmission mechanism, the gear position can be shifted among at least the three positions of a neutral position, a drive position, and a reverse position. When the gear position is in the neutral position, the engine is disconnected from the drive wheel. When the gear position is in the drive position, the driving force transmission mechanism transmits the output of the engine to the drive wheel as forward output to move the vehicle body forward, and turns the drive wheel forward. Also, when the gear position is in the reverse position, the driving force transmission mechanism transmits the output of the engine to the drive wheel as backup output for backing up the vehicle body, and turns the drive wheel in reverse.

The brake device 83 is provided with, for example, brake calipers, a cylinder that transmits oil pressure to the brake calipers according to the control input of the brake lever or the brake pedal, an electric motor that generates oil pressure in the cylinder, and an electronic control unit that controls the electric motor on the basis of a command signal transmitted from the driver assistance control device 6 and causes braking force to be generated according to the command.

The driver assistance control device 6 is a computer responsible for control related to the driver assistance functions. The driver assistance control device 6 is provided with an automated cruise controller 61, a following distance specifier 62, a vehicle speed specifier 63, a back out assistance controller 64, and a display controller 65 as modules for implementing the ACC function and the back out assistance function among a plurality of driver assistance functions.

When the ACC function is in the turned-on state, the automated cruise controller 61 executes an automated speed control that controls the vehicle speed on the basis of the set vehicle speed on the basis of a set vehicle speed set by the vehicle speed specifier 63 described later or an automated following distance control that automatically controls the following distance with respect to the vehicle ahead on the basis of a set vehicle speed. Note that hereinafter, the automated speed control and the automated following distance control performed by the automated cruise controller 61 are also collectively referred to as the automated cruise control.

More specifically, when the ACC function is in the turned-on state, the automated cruise controller 61 recognizes a vehicle ahead on the basis of the forward information acquired by the external recognition device 24, further recognizes the vehicle ahead as a following target vehicle if the vehicle ahead satisfies a following target condition determined on the basis of the set vehicle speed, and follows the following target vehicle by automatically controlling the following distance with respect to following target vehicle. More specifically, if the ACC function is in the turned-on state and the following target vehicle is successfully recognized on the basis of the forward information, the automated cruise controller 61 executes the automated following distance control to follow the following target vehicle while operating the driving force output device 82 and the brake device 83 such that the following distance with respect to the following target vehicle is a target following distance successively set by the vehicle speed specifier 63 described later.

Also, if the ACC function is in the turned-on state but a following target vehicle as described above is not successfully recognized on the basis of the forward information acquired by the external recognition device 24, the automated cruise controller 61 automatically controls the vehicle speed specified by the vehicle sensor unit 3. More specifically, if the ACC function is in the turned-on state and the following target vehicle is not successfully recognized on the basis of the forward information, the automated cruise controller 61 executes the automated speed control to operate the driving force output device 82 and the brake device 83 such that the vehicle speed is the set vehicle speed.

Here, the case in which the following target vehicle is not successfully recognized on the basis of the forward information includes not only the case in which a vehicle ahead does not exist ahead of the rider's own vehicle and within the range recognizable by the external recognition device 24, but also the case in which, although a vehicle ahead exists ahead of the rider's own vehicle and within the range recognizable by the external recognition device 24, the vehicle ahead does not satisfy the following target condition. Additionally, the following target condition in the present embodiment stipulates that, for example, the following distance with respect to the vehicle ahead is less than a predetermined set distance and the vehicle speed of the vehicle ahead is less than the set vehicle speed. That is, even if a vehicle ahead exists within the range recognizable by the external recognition device 24, the automated cruise controller 61 does not recognize the vehicle ahead as the following target vehicle if the vehicle ahead is at least the set distance away from the rider's own vehicle or if the vehicle ahead is traveling at the set vehicle speed or faster. For this reason, the vehicle speed does not regularly exceed the set vehicle speed while the automated following distance control is in effect and the following target vehicle is being followed.

Additionally, as described above, the automated cruise controller 61 automatically controls the vehicle speed using the set vehicle speed as a target while the automated speed control is in effect. For this reason, the vehicle speed likewise does not regularly exceed the set vehicle speed while the automated speed control is in effect. Consequently, while the automated cruise controller 61 is executing the automated cruise control, the vehicle speed does not regularly exceed the set vehicle speed or automatically accelerate beyond the set vehicle speed.

When the ACC function is in the turned-on state, the following distance specifier 62 sets a target following distance for the automated following distance control by the automated cruise controller 61. More specifically, the following distance specifier 62 sets the target following distance on the basis of forward information acquired by the external recognition device 24 and a detection result from the vehicle sensor unit 3. More specifically, the following distance specifier 62 calculates the vehicle speed of the following target vehicle and the actual following distance between the rider's own vehicle and the following target vehicle on the basis of the forward information, and additionally sets the target following distance such that the faster the vehicle speed of the following target vehicle is, the longer the target following distance is. The following distance specifier 62 transmits information related to the set target following distance to the automated cruise controller 61.

When the ACC function is in the turned-on state, the vehicle speed specifier 63 sets the set vehicle speed for the automated cruise control by the automated cruise controller 61 and transmits information related to the set vehicle speed to the automated cruise controller 61 and the display controller 65.

The vehicle speed specifier 63 sets or changes the set vehicle speed on the basis of an operation on the HMI 4 (in particular, the ACC lever 44) by the rider. More specifically, when the ACC function is in the standby state and the ACC lever 44 is detected as being turned to the "SET/−" side, the vehicle speed specifier 63 sets the vehicle speed at that time as the set vehicle speed. When the ACC function is in the standby state and the ACC lever 44 is detected as being turned to the "RES/+" side, the vehicle speed specifier 63 sets the value stored in the memory as the set vehicle speed. When the ACC function is in the turned-on state, the vehicle speed is equal to or greater than a predetermined speed, and the ACC lever 44 is detected as being turned to "RES/+" side, the vehicle speed specifier 63 increases the set vehicle speed in increments of the unit speed. Also, when the ACC function is in the turned-on state, the vehicle speed is equal to or greater than a predetermined speed, and the ACC lever 44 is detected as being turned to "SET/−" side, the vehicle speed specifier 63 decreases the set vehicle speed in decrements of the unit speed. Consequently, the rider can operate the ACC lever 44 to change the set vehicle speed or set a new set vehicle speed.

The display controller 65 notifies the rider of information related to a TSR function and the ACC function by causing the display 41 to display information related to the ACC function by the automated cruise controller 61, the following distance specifier 62, and the vehicle speed specifier 63, information related to the back out assistance function by the back out assistance controller 64, and the like.

The back out assistance controller 64 mainly executes a back out assistance control that controls the driving force output device 82 on the basis of operations by the rider on the ACC main switch 43, the ACC lever 44, and the brake lever 810, and assists the rider with backing out.

Figure 2:
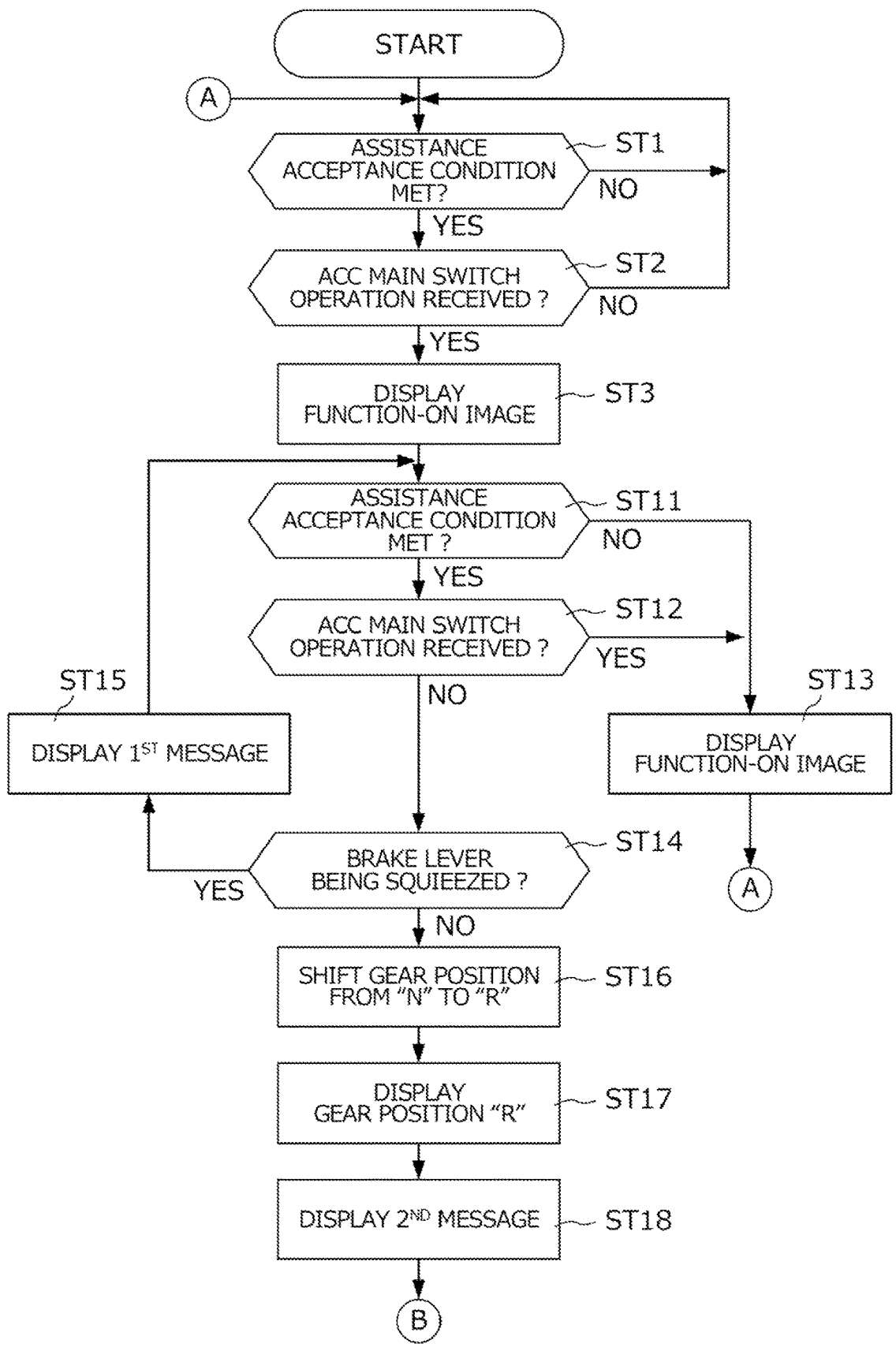
FIG. 2 is a flowchart illustrating a specific procedure of a back out assistance control by a back out assistance controller (1/7)
Figure 3:
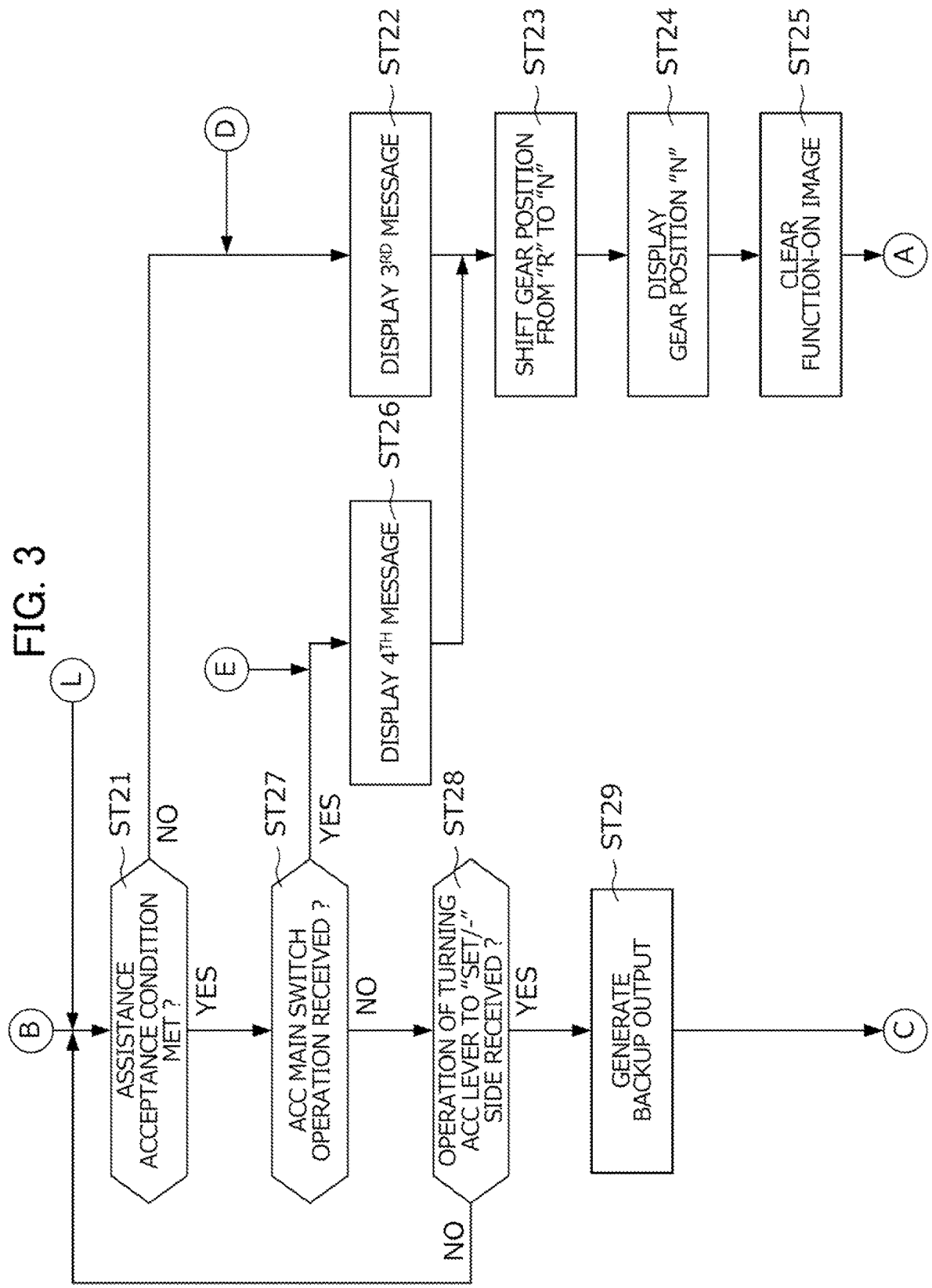
FIG. 3 is a flowchart illustrating a specific procedure of a back out assistance control by a back out assistance controller (2/7)
Figure 4:
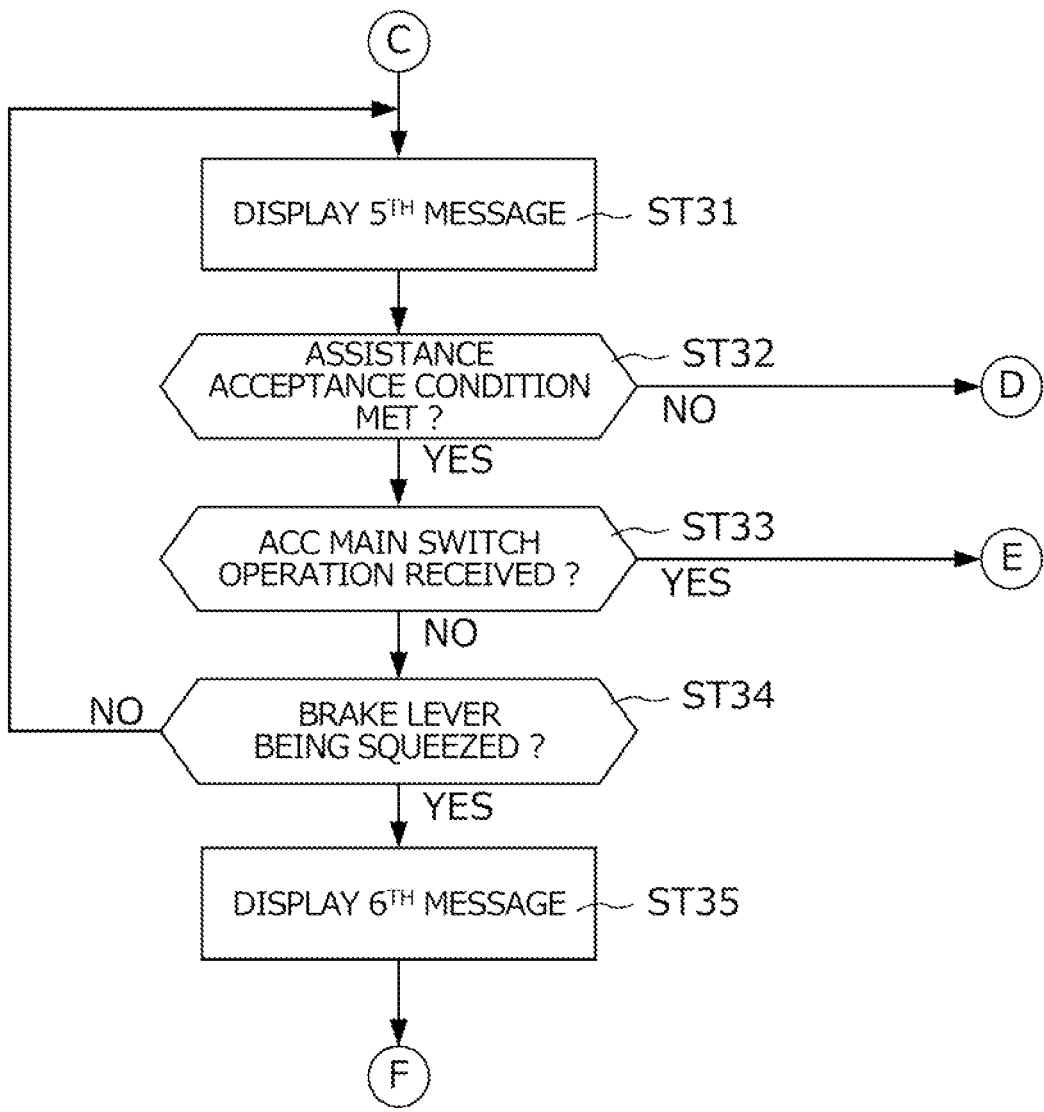
FIG. 4 is a flowchart illustrating a specific procedure of a back out assistance control by a back out assistance controller (3/7)
Figure 5:
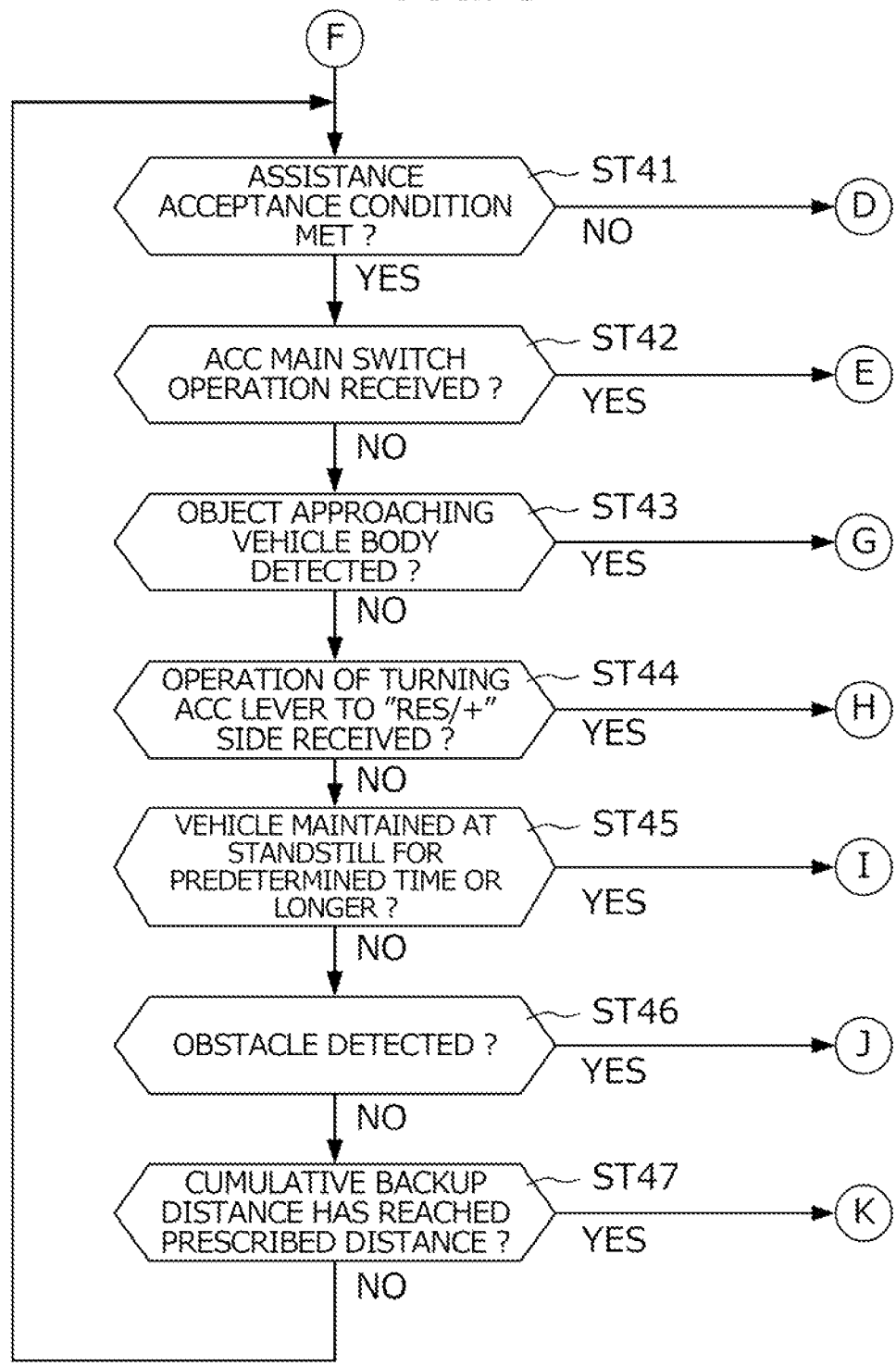
FIG. 5 is a flowchart illustrating a specific procedure of a back out assistance control by a back out assistance controller (4/7)
Figure 6:
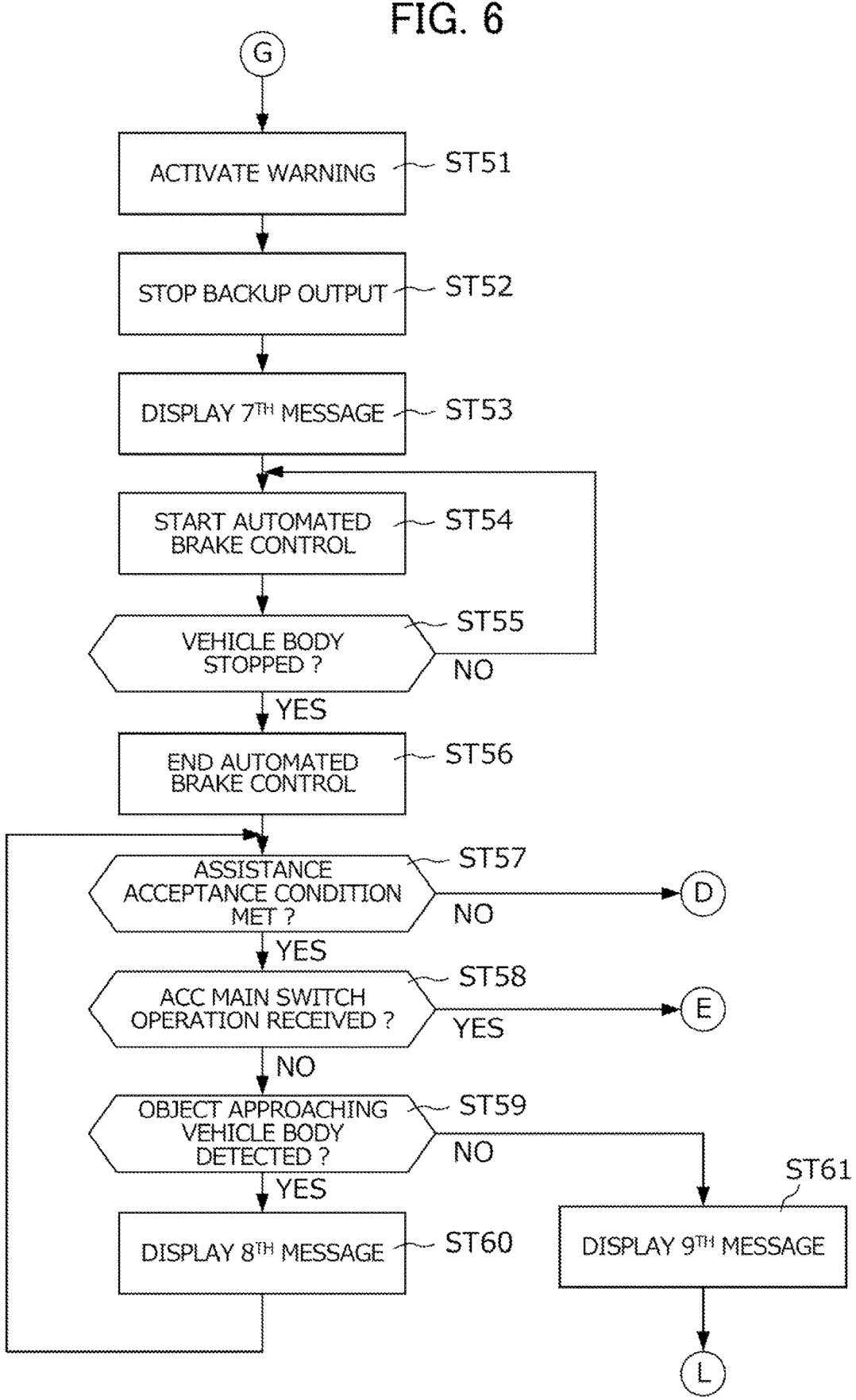
FIG. 6 is a flowchart illustrating a specific procedure of a back out assistance control by a back out assistance controller (5/7)
Figure 7:
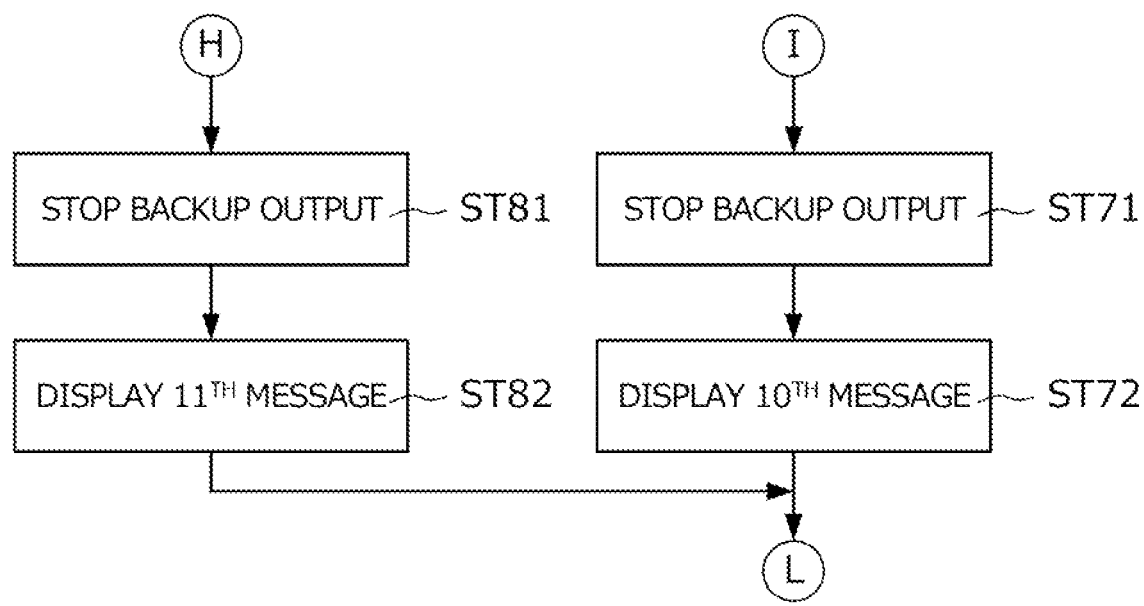
FIG. 7 is a flowchart illustrating a specific procedure of a back out assistance control by a back out assistance controller (6/7)
Figure 8:
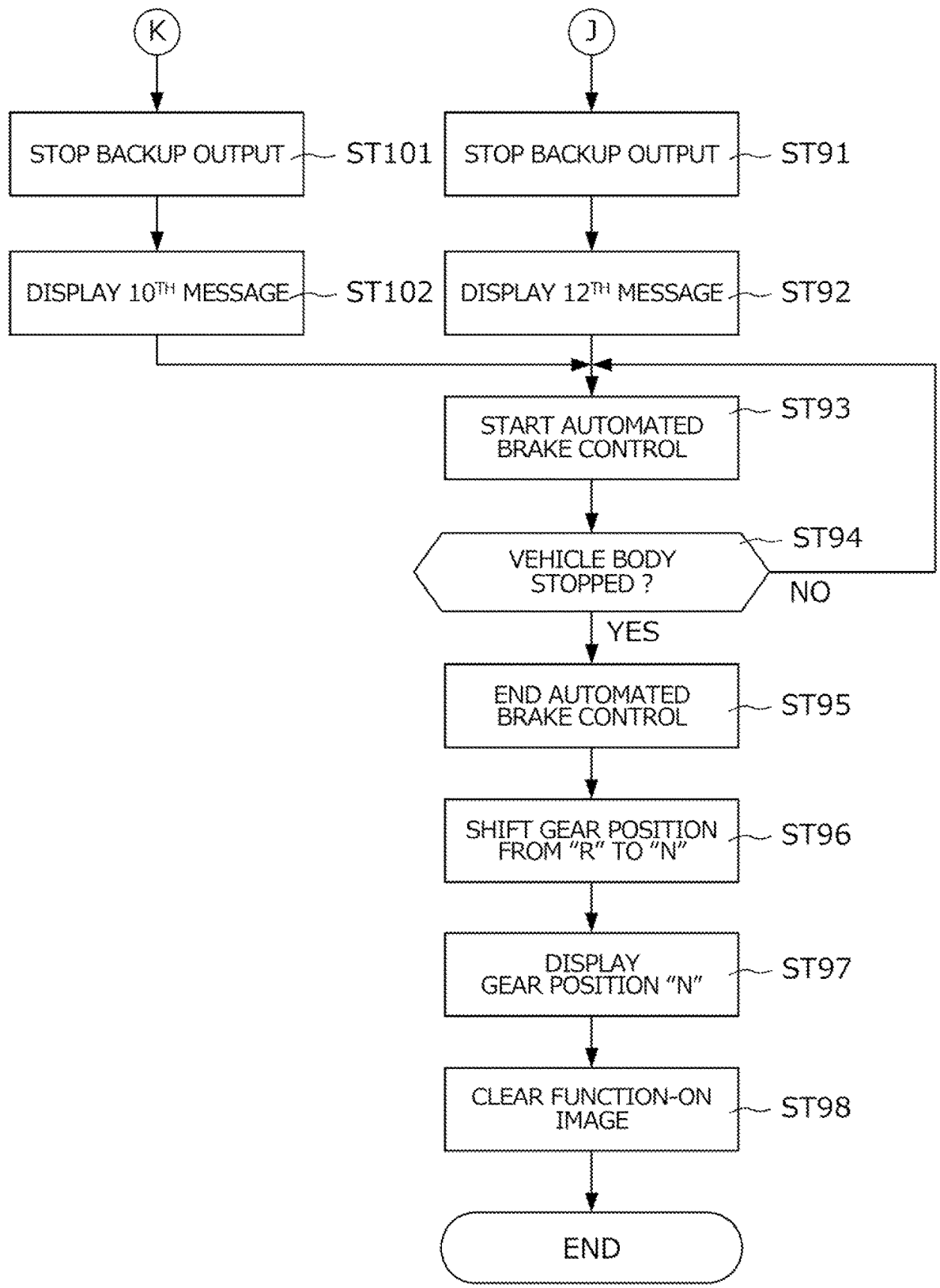
FIG. 8 is a flowchart illustrating a specific procedure of a back out assistance control by a back out assistance controller (7/7)

FIGS. 2 to 8 are flowcharts illustrating a specific procedure of the back out assistance control by the back out assistance controller 64. The flowchart illustrated in FIG. 2 is repeatedly executed on a predetermined control cycle in the back out assistance controller 64 after the main switch 815 is turned on by the rider and the driver assistance system 1 is started up.

First, in step ST1, the back out assistance controller 64 determines whether or not a predetermined assistance acceptance condition is met. Here, the assistance acceptance condition is a condition that must be satisfied to initiate the use of the ACC main switch 43 and the ACC lever 44 as control switches for the back out assistance function. More specifically, the back out assistance controller 64 determines that the assistance acceptance condition is met if all of the following four conditions are satisfied: the engine is running, the stand is in the retracted stage, the parking brake is released, and the gear position is "N" or "R". If any one of these four conditions is not satisfied, it is determined that the assistance acceptance condition is not met. If the determination result in step ST1 is NO, the back out assistance controller 64 returns to step ST1, and if YES, the back out assistance controller 64 proceeds to step ST2.

In step ST2, the back out assistance controller 64 determines whether or not an operation on the ACC main switch 43 by the rider is received. If the determination result in step ST2 is NO, the back out assistance controller 64 returns to step ST1, and if YES, the back out assistance controller 64 proceeds to step ST3.

Figure 9:
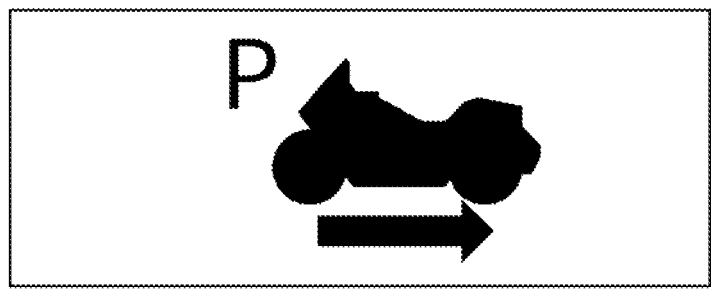
FIG. 9 is a diagram illustrating an example of a function-on image indicating that the back out assistance function is in the turned-on state.

In step ST3, the back out assistance controller 64 transmits to the display controller 65 a command causing the display 41 to display a function-on image like the one illustrated in FIG. 9, for example, to inform the rider that the back out assistance function is in the turned-on state.

In step ST11, the back out assistance controller 64 determines whether or not the assistance acceptance condition is met. If the determination result in step ST11 is NO, the back out assistance controller 64 proceeds to step ST13, and if YES, the back out assistance controller 64 proceeds to step ST12.

In step ST12, the back out assistance controller 64 determines whether or not an operation on the ACC main switch 43 by the rider is received. If the determination result in step ST12 is YES, the back out assistance controller 64 proceeds to step ST13, and if NO, the back out assistance controller 64 proceeds to step ST14.

In step ST13, the back out assistance controller 64 transmits to the display controller 65 a command for clearing the function-on image displayed in step ST3, and returns to step ST1.

In step ST14, the back out assistance controller 64 determines whether or not the brake lever is being squeezed by the rider. If the determination result in step ST14 is NO, the back out assistance controller 64 proceeds to step ST15, and if YES, the back out assistance controller 64 proceeds to step ST16.

In step ST15, the back out assistance controller 64 transmits to the display controller 65 a command causing the display 41 to display a first message indicating an operating procedure, and returns to step ST11. The content of the first message prompts the rider to operate the brake lever. Specifically, the first message is "Squeeze the brake lever to initiate back out assistance", for example.

In step ST16, the back out assistance controller 64 transmits to the driving force output device 82 a command for shifting the gear position from "N" to "R", and proceeds to step ST17. In step ST17, the back out assistance controller 64 transmits to the display controller 65 a command causing the display 41 to indicate that the current gear position is "R", and returns to step ST18.

In step ST18, the back out assistance controller 64 transmits to the display controller 65 a command causing the display 41 to display a second message indicating an operating procedure, and proceeds to step ST21. The content of the second message prompts the rider to operate the ACC lever 44. Specifically, the second message is "Turn the ACC lever to the 'SET/−' side to start backing up", for example.

In step ST21, the back out assistance controller 64 determines whether or not the assistance acceptance condition is met. If the determination result in step ST21 is YES, the back out assistance controller 64 proceeds to step ST27, and if NO, the back out assistance controller 64 proceeds to step ST22.

In step ST22, the back out assistance controller 64 transmits to the display controller 65 a command causing the display 41 to display a third message, and proceeds to step ST23. The content of the third message indicates the reason for canceling the back out assistance function. Specifically, the third message is "Cancel operation detected. Back out assistance terminated", for example.

In step ST27, the back out assistance controller 64 determines whether or not an operation on the ACC main switch 43 by the rider is received. If the determination result in step ST27 is YES, the back out assistance controller 64 proceeds to step ST26, and if NO, the back out assistance controller 64 proceeds to step ST28.

In step ST26, the back out assistance controller 64 transmits to the display controller 65 a command causing the display 41 to display a fourth message, and proceeds to step ST23. The content of the fourth message indicates the reason for canceling the back out assistance function. Specifically, the fourth message is "OFF operation detected. Back out assistance terminated", for example.

In step ST23, the back out assistance controller 64 transmits to the driving force output device 82 a command for shifting the gear position from "R" to "N", and proceeds to step ST24. In step ST24, the back out assistance controller 64 transmits to the display controller 65 a command causing the display 41 to indicate that the current gear position is "N", and proceeds to step ST25. In step ST25, the back out assistance controller 64 transmits to the display controller 65 a command for clearing the function-on image displayed in step ST13, and returns to step ST1.

In step ST28, the back out assistance controller 64 determines whether or not an operation by the rider for turning on the control switch for initiating backup of the vehicle body is received, that is, whether or not an operation by the rider of turning the ACC lever 44 to the "SET/−" side, is received. If the determination result in step ST28 is NO, the back out assistance controller 64 returns to step ST21, and if YES, the back out assistance controller 64 proceeds to step ST29.

In step ST29, the back out assistance controller 64, when triggered by receiving the operation of turning the ACC lever 44 to the "SET/−" side in step ST28, causes the driving force output device 82 to generate a predetermined amount of backup output, and proceeds to step ST31. Thereafter, the back out assistance controller 64 continues to cause the driving force output device 82 to generate the backup output until the conditions indicated in ST41 to ST47 described later are satisfied.

In step ST31, the back out assistance controller 64 transmits to the display controller 65 a command causing the display 41 to display a fifth message for prompting the rider to release his/her grip on the brake lever, and proceeds to step ST32. Specifically, the fifth message is "Let go of the brake lever to back up".

In step ST32, the back out assistance controller 64 determines whether or not the assistance acceptance condition is met. If the determination result in step ST32 is YES, the back out assistance controller 64 proceeds to step ST33, and if NO, the back out assistance controller 64 returns to step ST22.

In step ST33, the back out assistance controller 64 determines whether or not an operation on the ACC main switch 43 by the rider is received. If the determination result in step ST33 is YES, the back out assistance controller 64 returns to step ST26, and if NO, the back out assistance controller 64 proceeds to step ST34.

In step ST34, the back out assistance controller 64 determines whether or not the brake lever is being squeezed by the rider. If the determination result in step ST34 is YES, the back out assistance controller 64 returns to step ST31, and if NO, the back out assistance controller 64 proceeds to step ST35.

In step ST35, the back out assistance controller 64 transmits to the display controller 65 a command causing the display 41 to display a sixth message for notifying the rider that the vehicle body is backing up, and proceeds to step ST41. Specifically, the sixth message is "Backing up. Watch your surroundings". Consequently, thereafter, the rider can raise or lower the backup speed by adjusting the control input of the brake lever to increase or decrease the magnitude of the braking force.

In step ST41, the back out assistance controller 64 determines whether or not the assistance acceptance condition is met. If the determination result in step ST41 is YES, the back out assistance controller 64 proceeds to step ST42, and if NO, the back out assistance controller 64 returns to step ST22.

In step ST42, the back out assistance controller 64 determines whether or not an operation on the ACC main switch 43 by the rider is received. If the determination result in step ST42 is YES, the back out assistance controller 64 returns to step ST26, and if NO, the back out assistance controller 64 proceeds to step ST43.

In step ST43, the back out assistance controller 64 determines whether or not an object approaching the vehicle body from either the left or the right behind the vehicle body is detected by the rearward radar unit 23. If the determination result in step ST43 is YES, the back out assistance controller 64 proceeds to step ST51 to stop the backup output to avoid contact, and if NO, the back out assistance controller 64 proceeds to step ST44.

In step ST44, the back out assistance controller 64 determines whether or not an operation of turning the ACC lever 44 to the "RES/+" side is received. If the determination result in step ST44 is YES, the back out assistance controller 64 proceeds to step ST71 to stop the backup output on the basis of the intention of the rider, and if NO, the back out assistance controller 64 proceeds to step ST45.

In step ST45, the back out assistance controller 64 determines whether or not the vehicle body has been maintained at a standstill by continued operation of the brake lever for a predetermined time or longer. If the determination result in step ST45 is YES, the back out assistance controller 64 proceeds to step ST81 to stop the backup output on the basis of the intention of the rider, and if NO, the back out assistance controller 64 proceeds to step ST46.

In step ST46, the back out assistance controller 64 determines whether or not an obstacle is detected by the rearward radar unit 23 within the range of a certain distance behind the vehicle body. If the determination result in step ST46 is YES, the back out assistance controller 64 proceeds to step ST91 to stop the backup output to avoid contact, and if NO, the back out assistance controller 64 proceeds to step ST47.

In step ST47, the back out assistance controller 64 determines whether or not the cumulative backup distance measured by a backup distance sensor of the vehicle sensor unit 3 has reached a certain predetermined distance (for example, about one car length of an automobile). The cumulative backup distance is the cumulative value of the backup distance measured by the backup distance sensor up to the present since the backup of the vehicle body was first started by generating the backup output in step ST29. If the determination result in step ST47 is YES, the back out assistance controller 64 determines that the vehicle body has backed up the distance necessary to back out of the parking space and proceeds to step ST101 to stop the backup output, and if NO, the back out assistance controller 64 proceeds to step ST41.

As above, after causing the backup output to be generated when triggered by receiving the operation by the rider of turning on the control switch (the operation of turning the ACC lever 44 to the "SET/−" side) for switching on the back out assistance function (see step ST29), the back out assistance controller 64 continues to generate the backup output without requiring the rider to keep the control switch turned on, until the conditions illustrated in steps ST41 to ST47 are met.

In step ST51, the back out assistance controller 64 activates a warning directed at the rider, and proceeds to step ST52. More specifically, the back out assistance controller 64 causes the warning emitter 40 provided in the HMI 4 to emit a warning sound, thereby notifying the rider about the existence of an object approaching the rider's own vehicle.

In step ST52, the back out assistance controller 64 causes the driving force output device 82 to stop the backup output, and then proceeds to step ST53. In step ST53, the back out assistance controller 64 transmits to the display controller 65 a command causing the display 41 to display a seventh message for prompting the rider to operate the brake lever, and proceeds to step ST54. Specifically, the seventh message is "Something is approaching from the side. Squeeze the brake lever".

In step ST54, the back out assistance controller 64 starts an automated brake control that operates the brake device 83 automatically to generate braking force, and proceeds to step ST55. In step ST55, the back out assistance controller 64 determines whether or not the vehicle body is stopped. If the determination result in step ST55 is NO, the back out assistance controller 64 returns to step ST54, and if YES, the back out assistance controller 64 proceeds to step ST56. In step ST56, the back out assistance controller 64 ends the automated brake control started in step ST54, and proceeds to step ST57.

In step ST57, the back out assistance controller 64 determines whether or not the assistance acceptance condition is met. If the determination result in step ST57 is YES, the back out assistance controller 64 proceeds to step ST58, and if NO, the back out assistance controller 64 proceeds to step ST22.

In step ST58, the back out assistance controller 64 determines whether or not an operation on the ACC main switch 43 by the rider is received. If the determination result in step ST58 is YES, the back out assistance controller 64 returns to step ST26, and if NO, the back out assistance controller 64 proceeds to step ST59.

In step ST59, the back out assistance controller 64 determines whether or not an object approaching the vehicle body from either the left or the right behind the vehicle body is detected by the rearward radar unit 23. If the determination result in step ST59 is YES, the back out assistance controller 64 proceeds to step ST60, and if NO, the back out assistance controller 64 proceeds to step ST61.

In step ST60, the back out assistance controller 64 transmits to the display controller 65 a command causing the display 41 to display an eighth message for notifying the rider that the approach of an object is still being detected, and returns to step ST57. Specifically, the eighth message is "Something is approaching the vehicle. Check your surroundings. System in standby."

In step ST61, the back out assistance controller 64 transmits to the display controller 65 a command causing the display 41 to display a ninth message for notifying the rider about the procedure for resuming the back out, and returns to step ST21. Specifically, the ninth message is "Backup can be resumed. Check your surroundings. Turn the ACC lever to the 'SET/−' side to resume backup".

In step ST71, the back out assistance controller 64 causes the driving force output device 82 to stop the backup output, and then proceeds to step ST72. In step ST72, the back out assistance controller 64 transmits to the display controller 65 a command causing the display 41 to display a 10th message for notifying the rider about the procedure for resuming the back out, and returns to step ST21. Specifically, the 10th message is "Operation of turning the ACC lever to the 'RES/+' side detected. Turn the ACC lever to the 'SET/−' side to resume backup".

In step ST81, the back out assistance controller 64 causes the driving force output device 82 to stop the backup output, and then proceeds to step ST82. In step ST82, the back out assistance controller 64 transmits to the display controller 65 a command causing the display 41 to display an 11th message for notifying the rider about the procedure for resuming the back out, and returns to step ST21. Specifically, the 11th message is "Prolonged stop detected. Turn the ACC lever to the 'SET/−' side to resume backup".

In step ST91, the back out assistance controller 64 causes the driving force output device 82 to stop the backup output, and then proceeds to step ST92. In step ST92, the back out assistance controller 64 transmits to the display controller 65 a command causing the display 41 to display a 12th message for notifying the rider about the reason for terminating the back out, and proceeds to step ST93. Specifically, the 12th message is "Approaching rear obstacle. Squeeze the brake lever. Back out assistance function terminated".

In step S93, the back out assistance controller 64 starts the automated brake control and proceeds to step ST94. In step ST94, the back out assistance controller 64 determines whether or not the vehicle body is stopped. If the determination result in step ST94 is NO, the back out assistance controller 64 returns to step ST93, and if YES, the back out assistance controller 64 proceeds to step ST95. In step ST95, the back out assistance controller 64 ends the automated brake control started in step ST93, and proceeds to step ST96.

In step ST96, the back out assistance controller 64 transmits to the driving force output device 82 a command for shifting the gear position from "R" to "N", and proceeds to step ST97. In step ST97, the back out assistance controller 64 transmits to the display controller 65 a command causing the display 41 to indicate that the current gear position is "N", and proceeds to step ST98. In step ST98, the back out assistance controller 64 transmits to the display controller 65 a command for clearing the function-on image displayed in step ST13, and ends the back out assistance control.

In step ST101, the back out assistance controller 64 causes the driving force output device 82 to stop the backup output, and then proceeds to step ST102. In step ST102, the back out assistance controller 64 transmits to the display controller 65 a command causing the display 41 to display a 13th message for notifying the rider about the reason for terminating the back out, and proceeds to step ST93. Specifically, the 13th message is "Vehicle has backed up maximum assistance distance. Squeeze the brake lever. Back out assistance function terminated".

The driver assistance system 1 according to the present embodiment exhibits the following effects.

(1) The driver assistance system 1 for a motorcycle is provided with: the driving force output device 82 that generates a backup output for reversing the drive wheel and backing up the vehicle body; the brake lever 810 squeezably operable by the rider; the ACC main switch 43 and the ACC lever 44 operable by the rider; and the back out assistance controller 64 that controls the driving force output device 82 on the basis of the operation of the brake lever 810, the ACC main switch 43, and the ACC lever 44. After the ACC main switch 43 is turned on, the back out assistance controller 64 causes the driving force output device 82 to generate the backup output and start backing up the vehicle body when triggered by receiving an operation of turning the ACC lever 44 to the "SET/−" side. Also, after the backup output is generated, the back out assistance controller 64 continues to cause the backup output to be generated until the brake lever 810 is operated, or the ACC main switch 43 or ACC lever 44 is turned off. Accordingly, when backing the vehicle out of a parking space, the rider can cause the vehicle body to keep backing up simply by turning the ACC lever 44 to the "SET/−" side initially, without having to keep the ACC lever 44 turned to the "SET/−" side. Thus, according to the driver assistance system 1, the rider can grip the handlebar grips so that the vehicle body does not tip over and concentrate on maintaining balance so that the vehicle body does not fall while also paying attention to the rear as well as the left and right of the vehicle, thereby lessening the burden on the rider when backing out. Furthermore, according to the driver assistance system 1, by lessening the burden on the rider when backing out, contact with another vehicle and the tip over of the rider's own vehicle when backing out can also be suppressed, thereby improving traffic safety.

(2) In the driver assistance system 1, the back out assistance controller 64 stops the backup output if an object approaching the vehicle body is detected by the rearward radar unit 23 while backing up the vehicle body. Thus, according to the driver assistance system 1, since the vehicle stops automatically if another vehicle approaches the rider's own vehicle while backing up the vehicle body, contact with the other vehicle can be suppressed, and by extension, traffic safety can also be improved.

(3) In the driver assistance system 1, the back out assistance controller 64 activates a warning by the warning emitter 40 and stops the backup output if an object approaching the vehicle body is detected by the rearward radar unit 23 while backing up the vehicle body. Thus, according to the driver assistance system 1, the rider can rapidly grasp that the backup of the vehicle body has stopped automatically because of the approach of another vehicle, and immediately resume backup of the vehicle body after confirming that the other vehicle has passed.

(4) After initiating backup of the vehicle body, the back out assistance controller 64 stops the backup output in response to the backup distance reaching a predetermined distance. Thus, according to the driver assistance system 1, when the backup distance reaches the predetermined distance after the backup of the vehicle body is initiated by the rider performing the operation of turning the ACC lever 44 to the "SET/−" side, the vehicle stops automatically without requiring the rider to operate the brake lever 810, the ACC main switch 43, the ACC lever 44, or the like, and therefore the burden on the rider when backing out can be lessened further, and by extension, traffic safety can be improved further.

(5) After causing the backup output to be generated, the back out assistance controller 64 stops the backup output in a case where the vehicle body is maintained at a standstill by the operation of the brake lever 810 for a predetermined time or longer. Thus, according to the driver assistance system 1, the backup output does not stop immediately even if the backup speed goes to 0 temporarily while the rider is backing up the vehicle body while adjusting the backup speed by operating the brake lever 810, and therefore convenience can be improved.

The foregoing describes an embodiment of the present invention, but the present invention is not limited thereto. The particulars of the configuration may be modified as appropriate within the scope of the present invention.

What is claimed is:

1. A driver assistance system for a motorcycle, the driver assistance system comprising:
    a wheel driver that generates a forward output for turning a wheel forward and moving a vehicle body forward, or generates a backup output for reversing the wheel and backing up the vehicle body;
    a brake lever squeezably operable by a rider;
    a control switch operable by the rider; and
    a backup assistance controller that controls the wheel driver on a basis of an operation of the brake lever and the control switch, wherein
    the backup assistance controller, after causing the wheel driver to generate the backup output when triggered by the control switch being turned on, continues to cause the backup output to be generated until the brake lever is operated or the control switch is turned off.

2. The driver assistance system for a motorcycle according to claim 1, further comprising:
    a rear sensor that detects an object behind the vehicle body, wherein
    the backup assistance controller stops the backup output in a case where an object approaching the vehicle body is detected by the rear sensor while backing up the vehicle body.

3. The driver assistance system for a motorcycle according to claim 2, further comprising:
    a warning emitter that produces a warning directed at the rider, wherein
    the backup assistance controller activates a warning by the warning emitter and stops the backup output in a case where an object approaching the vehicle body is detected by the rear sensor while backing up the vehicle body.

4. The driver assistance system for a motorcycle according to claim 1, further comprising:
    a backup distance measurer that measures a backup distance of the vehicle body, wherein
    the backup assistance controller, after initiating backup of the vehicle body, stops the backup output in response to the backup distance reaching a predetermined distance.

5. The driver assistance system for a motorcycle according to claim 1, wherein
    the backup assistance controller, after causing the backup output to be generated, stops the backup output in a case where the vehicle body is maintained at a standstill by the operation of the brake lever for a predetermined time or longer.

* * * * *